(12) United States Patent
Kinugasa

(10) Patent No.: US 9,264,640 B2
(45) Date of Patent: Feb. 16, 2016

(54) PHOTOELECTRIC CONVERSION APPARATUS, METHOD FOR DRIVING PHOTOELECTRIC CONVERSION APPARATUS, AND IMAGING SYSTEM

(71) Applicant: CANON KABUSHIKI KAISHA, Tokyo (JP)

(72) Inventor: Tomohisa Kinugasa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 321 days.

(21) Appl. No.: 14/031,482

(22) Filed: Sep. 19, 2013

(65) Prior Publication Data

US 2014/0085519 A1 Mar. 27, 2014

(30) Foreign Application Priority Data

Sep. 26, 2012 (JP) ................................. 2012-212541

(51) Int. Cl.
*H04N 5/3745* (2011.01)
*H04N 5/378* (2011.01)
*H04N 5/374* (2011.01)

(52) U.S. Cl.
CPC ............. *H04N 5/3745* (2013.01); *H04N 5/378* (2013.01); *H04N 5/3741* (2013.01)

(58) Field of Classification Search
USPC ................................. 348/300, 301, 307, 308
See application file for complete search history.

(56) References Cited

U.S. PATENT DOCUMENTS

| 2001/0054744 | A1* | 12/2001 | Scott-Thomas | H04N 3/1512 257/443 |
| 2005/0240787 | A1* | 10/2005 | Palem | G06F 1/32 713/320 |
| 2007/0008206 | A1* | 1/2007 | Tooyama | H03M 1/0607 341/155 |
| 2012/0182075 | A1* | 7/2012 | Ivanov | H03F 1/086 330/310 |

FOREIGN PATENT DOCUMENTS

JP 2000-078472 A 3/2000

* cited by examiner

*Primary Examiner* — Twyler Haskins
*Assistant Examiner* — Akshay Trehan
(74) *Attorney, Agent, or Firm* — Canon USA, Inc. IP Division

(57) ABSTRACT

This application relates to a photoelectric conversion apparatus which performs photoelectric conversion on incident light, a method for driving a photoelectric conversion apparatus, and an imaging system having a photoelectric conversion apparatus. The potential of one main node is prevented from approaching a predetermined potential which controls the voltage between a control node of a switch Metal Oxide Semiconductor (MOS) transistor and the one main node of the switch MOS transistor within a threshold voltage in a period when the predetermined potential is given and a signal based on the charge in the photoelectric converting unit is given to the one input node.

17 Claims, 8 Drawing Sheets

PHOTOELECTRIC CONVERSION APPARATUS, METHOD FOR DRIVING PHOTOELECTRIC CONVERSION APPARATUS, AND IMAGING SYSTEM

BACKGROUND OF THE INVENTION

1. Field of the Invention

One disclosed aspect of the embodiments relates to a photoelectric conversion apparatus which performs photoelectric conversion on incident light, a method for driving a photoelectric conversion apparatus, and an imaging system having a photoelectric conversion apparatus.

2. Description of the Related Art

A photoelectric conversion apparatus has been known which outputs a signal acquired by performing photoelectric conversion on incident light. As an example of such a photoelectric conversion apparatus, Japanese Patent Laid-Open No. 2000-78472 discloses a photoelectric conversion apparatus including a photoelectric converting unit which performs photoelectric conversion on incident light, a differential amplifying unit which outputs a signal based on a signal output by the photoelectric converting unit, and an output circuit which outputs a signal based on a signal output by the differential amplifying unit. The photoelectric conversion apparatus further includes a signal holding unit which is provided on an electrical path between the output circuit and the differential amplifying unit and holds a signal output by the differential amplifying unit, and a switch Metal Oxide Semiconductor (MOS) transistor to be used to select whether to bring the electrical path between the signal holding unit and the differential amplifying unit into conduction. The photoelectric conversion apparatus disclosed in Japanese Patent Laid-Open No. 2000-78472 further includes a plurality of pixel parts each having the photoelectric converting unit, differential amplifying unit, and switch MOS transistor provided on the feedback path to the differential amplifying unit.

SUMMARY OF THE INVENTION

According to an aspect of the embodiments, there is provided a photoelectric conversion apparatus including a photoelectric converting unit which stores a charge generated by photoelectric conversion on incident light, a differential amplifying unit having one input node electrically connected to the photoelectric converting unit, a switch Metal Oxide Semiconductor (MOS) transistor, having one main node electrically connected to an output node of the differential amplifying unit, and having the other main node electrically connected to the other input node of the differential amplifying unit, and a potential control unit. The potential control unit controls a potential of the one main node such that the potential of the one main node is prevented from approaching a predetermined potential which controls the voltage between a control node of the switch MOS transistor and the one main node of the switch MOS transistor within a threshold voltage in a period when the predetermined potential is given to the control node and a signal based on the charge in the photoelectric converting unit is given to the one input node.

According to another aspect of the embodiments, there is provided a method for driving a photoelectric conversion apparatus having a photoelectric converting unit which stores a charge generated by photoelectric conversion on incident light, a differential amplifying unit having one input node electrically connected to the photoelectric converting unit, and a switch MOS transistor, the switch MOS transistor having one main node electrically connected to an output node of the differential amplifying unit, the switch MOS transistor having the other main node electrically connected to the other input node of the differential amplifying unit. The method includes controlling a potential of the one main node such that the potential of the one main node may be prevented from approaching a predetermined potential which controls the voltage between a control node of the switch MOS transistor and the one main node of the switch MOS transistor within a threshold voltage in a period when the predetermined potential is given to the control node and a signal based on the charge in the photoelectric converting unit is given to the one input node.

Further features of the disclosure will become apparent from the following description of exemplary embodiments with reference to the attached drawings.

DESCRIPTION OF THE EMBODIMENTS

In a photoelectric conversion apparatus disclosed in Japanese Patent Laid-Open No. 2000-78472, a signal based on a charge in the photoelectric converting unit is given to the differential amplifying unit even during a period when a voltage between a source and a gate of the switch MOS transistor is equal to or smaller than a threshold voltage. Some signal output by the differential amplifying unit during this period may bring the potential of the source of the switch MOS transistor closer to the potential of the gate toward turning on the switch MOS transistor, possibly resulting in feeding of a subthreshold leakage current to the switch MOS transistor, disadvantageously.

Embodiments to be described below relate to a photoelectric conversion apparatus, a method for driving a photoelectric conversion apparatus, and an imaging system which may overcome the problem.

[First Embodiment]

With reference to drawings, a configuration of a first embodiment will be described. One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

Figure 1A:
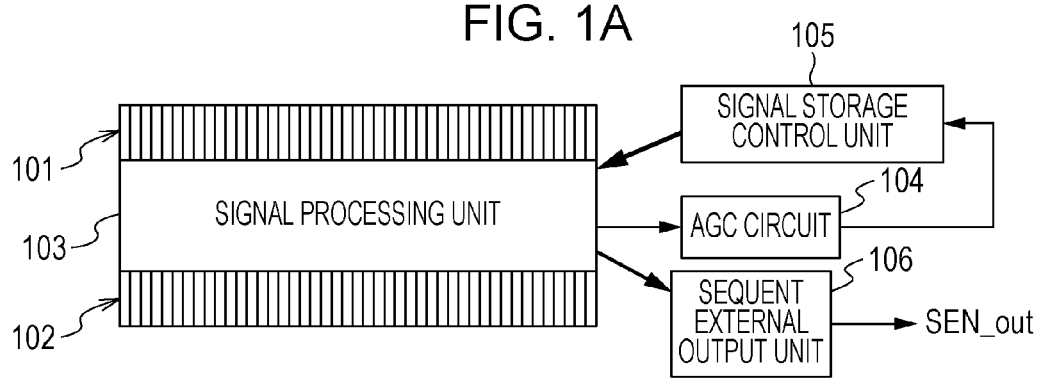
FIG. 1A is a block diagram illustrating an example of a pixel part.

FIG. 1A is a schematic diagram illustrating an example of a photoelectric conversion apparatus. The photoelectric conversion apparatus includes a plurality of pixel parts 101 and a signal processing unit 103 which processes signals output from the plurality of pixel parts 101. Each of the pixel parts 101 has a photoelectric converting unit and a signal holding unit. The photoelectric converting unit generates a charge based on incident light, and the signal holding unit holds a signal based on the charge. Even after a signal is output from the pixel part 101, the signal holding unit holds signal.

The signal processing unit 103 outputs a maximum value and a minimum value of signals output from the plurality of pixel parts 101 to an AGC circuit 104 (where AGC stands for auto gain control). On basis of signals of the maximum value and minimum value output from the signal processing unit 103, the AGC circuit 104 selects whether to continue the signal storage operation of the plurality of pixel parts 101 or not. The AGC circuit 104 then outputs a selection result signal indicating the selected result to a signal storage control unit 105. The operation of the plurality of pixel parts 101, signal processing unit 103, and AGC circuit 104 will be described as a first operation. The signal storage control unit 105 controls whether to continue a signal storage operation of the plurality of pixel parts 101 on basis of the selection result signal output from the AGC circuit 104. If control is to be performed under which the plurality of pixel parts 101 continue the signal storage operation, the pixel parts 101, signal processing unit 103, and AGC circuit 104 perform the same operation as the first operation above. On the other hand, if control is to be performed under which the signal storage control unit 105 finishes the signal storage operation of the plurality of pixel parts 101, a shift register 102 causes the plurality of pixel parts 101 to sequentially output signals held in the pixel parts 101 which are output signals in the previous first operation to the signal processing unit 103. The signal processing unit 103 sequentially outputs the signals output by the plurality of pixel parts 101 to an external output unit 106.

The external output unit 106 outputs signals output from the signal processing unit 103 serving as signals SEN_out to an external device to the photoelectric conversion apparatus.

Figure 1B:
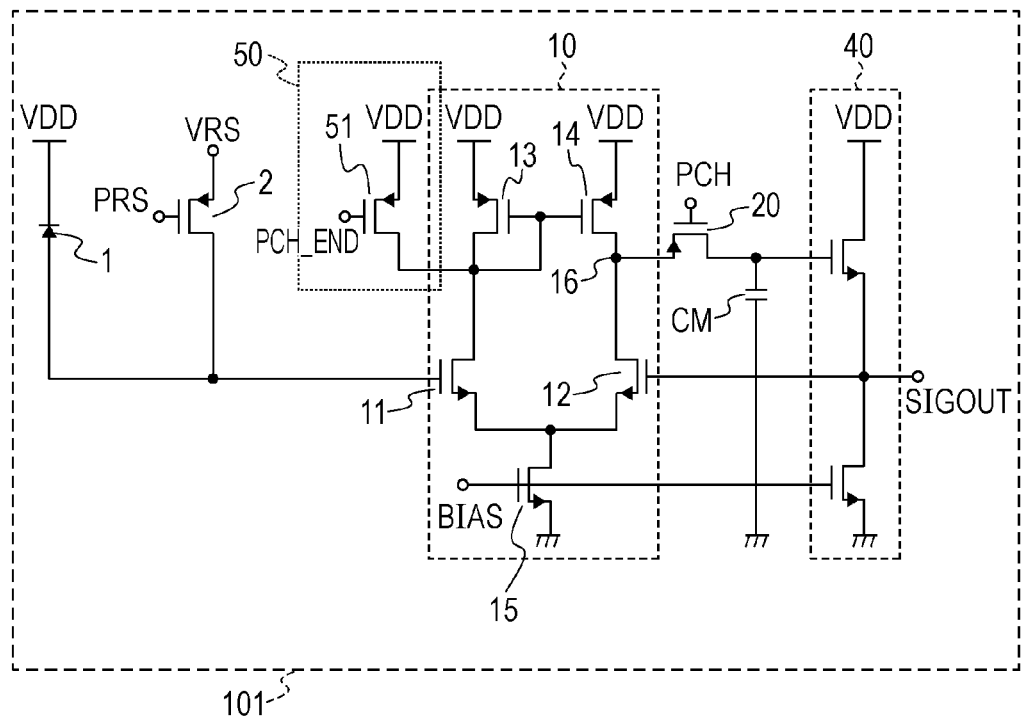
FIG. 1B is an equivalent circuit diagram illustrating an example of a pixel part.

FIG. 1B illustrates an example of an equivalent circuit of a pixel part 101 in the photoelectric conversion apparatus according to this embodiment.

The photoelectric converting unit 1 stores a charge generated by photoelectric conversion on incident light. The photoelectric converting unit 1 gives the potential based on the stored charge to the MOS transistor 11.

The photoelectric converting unit 1 in the pixel part 101 illustrated in FIG. 1B stores positive holes generated on basis of incident light.

When a reset pulse PRS to be given to a gate of a MOS transistor 2 has a High level (hereinafter, described as H level while a Low level will be described as L level), the MOS transistor 2 resets the potentials of the photoelectric converting unit 1 and a gate of the MOS transistor 11 on basis of reset voltage VRS.

For easy understanding herein, regardless of whether a MOS transistor is a PMOS transistor or an NMOS transistor, description will be given that the MOS transistor is turned on if the pulse to be applied to its gate has the H level and is turned off if the pulse to be applied to its gate has the L level. For easy understanding herein, values of signals are compared in magnitude on basis of the absolute values of the signals. For example, it is described herein that in either case where the charge stored by the photoelectric converting unit 1 is positive holes or electrons, a signal output by the photoelectric converting unit 1 increases with an increase of the amount of incident light. The notation of signal values in magnitude is applied to not only signals from the photoelectric converting unit 1 but also signals output by another element.

The differential amplifier circuit 10 has the MOS transistor 11, a MOS transistor 12, a MOS transistor 13, a MOS transistor 14, a MOS transistor 15 for a current source, and an output node 16. The MOS transistor 13 and MOS transistor 14 receive power supply voltage VDD and constitute a current mirror circuit. In other words, gates of the MOS transistor 13 and MOS transistor 14 and one main node of the MOS transistor 13 are electrically connected to a first node. The MOS transistor 13 and MOS transistor 14 constitute an active load in the differential amplifier circuit 10. The differential amplifier circuit 10 is a differential amplifying unit according to this embodiment. A gate of the MOS transistor 11 is an input node of the differential amplifying unit. The output node 16 is an output node of the differential amplifying unit. The MOS transistor 13 is a first MOS transistor included in the differential amplifying unit. The MOS transistor 14 is a second MOS transistor included in the differential amplifying unit. The MOS transistor 11 is a third MOS transistor included in the differential amplifying unit. The MOS transistor 12 is a fourth MOS transistor included in the differential amplifying unit.

The output node 16 is electrically connected to a capacitance element CM and an input node of a follower circuit 40 through a switch MOS transistor 20. The follower circuit 40 functions as an output circuit according to this embodiment.

An output node of the follower circuit 40 is electrically connected to the MOS transistor 12, and an output SIGOUT from the follower circuit 40 is fed back to the differential amplifier circuit 10. In other words, the switch MOS transistor 20 is provided in a feedback path to the differential amplifier circuit 10. The follower circuit 40 outputs an output SIGOUT to the signal processing unit 103. The capacitance element CM corresponds to a signal holding unit according to this embodiment. An output SIGOUT from the follower circuit 40 is an output signal output by the output circuit according to this embodiment.

The pixel part 101 according to this embodiment has a MOS transistor 51 serving as a potential control unit 50. The MOS transistor 51 has one main node that receives power supply voltage VDD. The MOS transistor 51 has the other main node electrically connected to a node to which gates of both of the MOS transistor 13 and MOS transistor 14 and one main node of the MOS transistor 13 are electrically connected in common. The MOS transistor 51 is a fifth MOS transistor included in the potential control unit 50.

Next, with reference to FIG. 1C, an operation of the photoelectric conversion apparatus having the pixel parts 101 illustrated in FIG. 1B will be described.

Figure 1C:
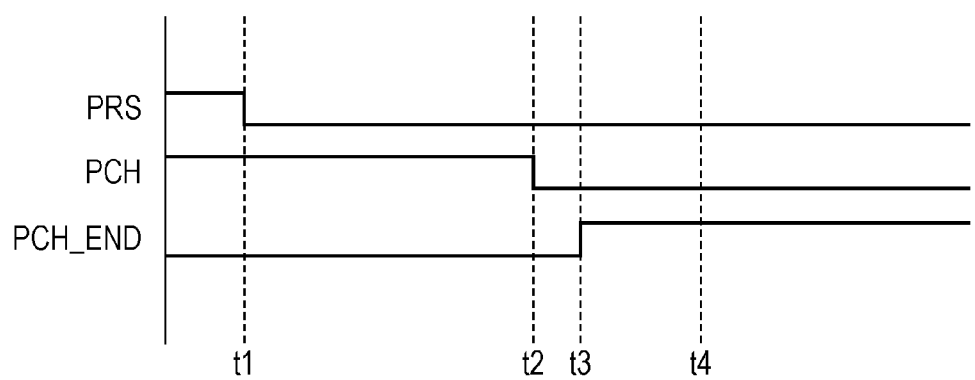
FIG. 1C is a timing chart illustrating an example of operations by a photoelectric conversion apparatus.

A pulse PCH illustrated in FIG. 1C is a pulse to be given to a gate that is a control node of the switch MOS transistor 20. When the pulse PCH has the H level, the capacitance element CM of the output node 16 and the input node of the follower circuit 40 are brought into conduction. A pulse PCH_END is a pulse to be given to a gate of the MOS transistor 51. When a pulse PCH_END has the H level, a potential based on power supply voltage VDD is given to one main node of the MOS transistor 13 and a gate of each of the MOS transistor 13 and MOS transistor 14. A pulse HSR is a pulse with which the shift register 102 causes each of the pixel parts 101 to output a signal based on an output signal of each of the pixel parts 101 to the signal processing unit 103.

Before a time t1, the pulses PRS and PCH have the H level. This resets the photoelectric converting unit 1, differential amplifier circuit 10, and capacitance element CM. The pulse PCH_END has the L level.

At the time t1, the pulse PRS is shifted to the L level, which cancels the resets of the photoelectric converting unit 1 and differential amplifier circuit 10. The photoelectric converting unit 1 gives the potential based on a stored charge acquired by photoelectric conversion on incident light to a gate of the MOS transistor 11.

At a time t2, the pulse PCH is shifted to the L level. That is, the gate of the switch MOS transistor 20 has an OFF potential. The pulse PCH at the L level has a predetermined potential which keeps voltage between a gate and a source of the switch MOS transistor 20 to a threshold voltage or lower. Thus, the capacitance element CM holds a charge based on a signal output from the output node 16 at the time t2. The photoelectric converting unit 1 is continuously exposed, and the potential of the gate of the MOS transistor 13 increases. However, because the switch MOS transistor 20 is in an OFF state, the amount of charge held by the capacitance element CM does not change.

Figure 2A:
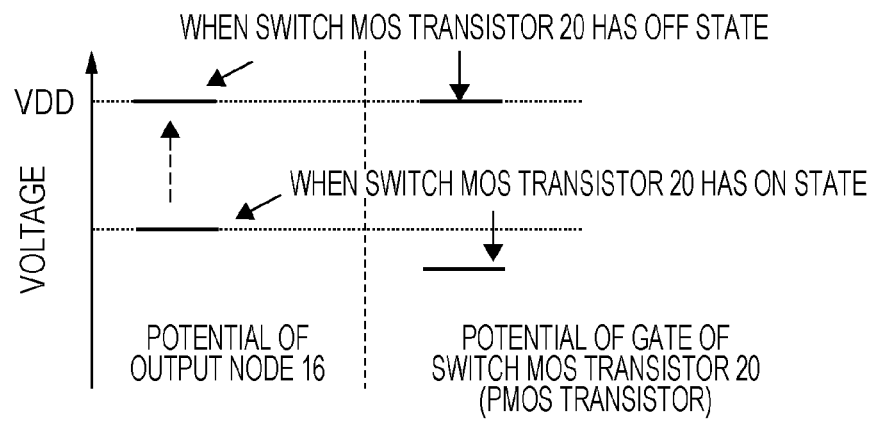
FIG. 2A is an explanatory diagram on potentials of a switch MOS transistor.

At a time t3, the pulse PCH_END is shifted to the H level. Accordingly, the potentials of the gates of the MOS transistor 13 and MOS transistor 14 are clipped to the power supply voltage VDD. Thus, a signal output from the output node 16 has a signal level lowered by a threshold voltage of the MOS transistor 14 from the signal level of the signal output from the follower circuit 40. FIG. 2A illustrates potentials of a main node of the switch MOS transistor 20 electrically connected to the output node 16 (hereinafter, described as an input node of the switch MOS transistor 20) and a gate of the switch MOS transistor 20. The potential of the gate of the switch MOS transistor 20 illustrated in FIG. 2A exhibits a potential to be given actually. It should be noted that the H level and the L level of the potential illustrated in FIG. 2A are opposite to those of the pulse PCH illustrated in the timing chart in FIG. 1C because in this specification it is defined that the MOS transistor is turned on if the pulse to be applied to its gate has the H level and is turned off if the pulse to be applied to its gate has the L level. Referring to FIG. 2A, the potentials of the input node of the switch MOS transistor 20 when the switch MOS transistor 20 has the ON state and has the OFF state will be described. When the switch MOS transistor 20 has the OFF state, the MOS transistor 12 receives a fixed signal SIGOUT output from the follower circuit 40. In other words, the differential amplifier circuit 10 has an open loop state and thus may operate as a comparator. The amount of charge to be given to a gate of the MOS transistor 11 increases as a result of continuous exposure of the photodiode 1. The potential of the output node 16 in the differential amplifier circuit 10 having the open loop state increases from the potential when the switch MOS transistor 20 has the ON state approximately to power supply voltage VDD in the photoelectric conversion apparatus disclosed in Japanese Patent Laid-Open No. 2000-78472. In other words, the potential of the input node of the switch MOS transistor 20 increases toward turning on the switch MOS transistor 20 when the switch MOS transistor 20 is turned off. This increases the subthreshold leakage current occurring in the switch MOS transistor 20. Thus, even in a period when an OFF potential is given to the gate of the switch MOS transistor 20, the amount of charge held in the capacitance element CM may easily change. On the other hand, in the photoelectric conversion apparatus of this embodiment, the potential difference between the input node and the gate of the switch MOS transistor 20 is increased toward turning off the switch MOS transistor 20. In other words, according to this embodiment, the potential of the input node of the switch MOS transistor 20 is lower than power supply voltage VDD. Thus, an imaging apparatus according to this embodiment is allowed to reduce the subthreshold leakage current in a period when an OFF potential is given to the gate of the switch MOS transistor 20. In the photoelectric conversion apparatus of this embodiment, the potential control unit controls the potential of one main node of the switch MOS transistor so that subthreshold leakage current is reduced from the subthreshold leakage current occurring in the switch MOS transistor as a result of the differential amplifying unit outputting a signal to the output node on basis of the signal based on the charge given to one input node. In other words, the potential of the input node is controlled to suppress the potential of the input node of the switch MOS transistor 20 approaching the predetermined potential given to the control node of the switch MOS transistor 20. In an imaging apparatus according to this embodiment, the amount of charge held in the capacitance element CM may not easily change advantageously.

At or after a time t4, the shift register 102 causes the pixel parts 101 to sequentially output signals to the signal processing unit 103.

Figure 2B:
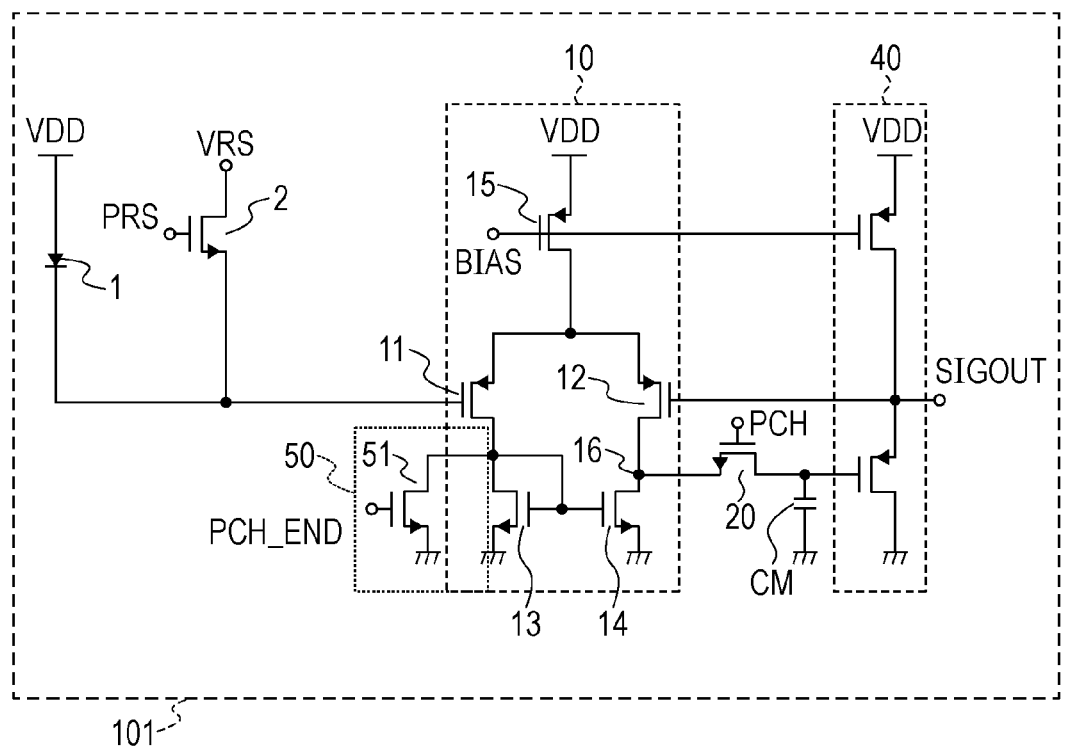
FIG. 2B is an equivalent circuit diagram illustrating another example of a pixel part.

FIG. 2B illustrates an equivalent circuit of the pixel part 101 having another configuration. Like reference numerals refer to like members having the same functions between the pixel parts 101 in FIG. 1B and FIG. 2B. In the pixel part 101 illustrated in FIG. 1B, the photoelectric converting unit 1 stores positive holes on basis of incident light. On the other hand, in the pixel part 101 illustrated in FIG. 2B, the photoelectric converting unit 1 stores a charge on basis of incident light. The conductivity type of the MOS transistors included in the pixel part 101 having this configuration may be the opposite to the conductivity type of the MOS transistors included in the pixel part 101 in FIG. 1B. In this configuration, at or after a time t3, the potentials of the gates of the MOS transistor 13 and MOS transistor 14 are clipped to ground level potential.

According to this embodiment, the photoelectric converting unit 1 and the MOS transistor 11 are directly connected. However, this embodiment is not limited to such configuration and a switch may be provided in an electrical path between the photoelectric converting unit 1 and the MOS transistor 11. In this configuration, it may only be required that the switch is kept on from before the time t1 to at least the time t4 in the operation illustrated in FIG. 1C.

The capacitance element CM may be an independent element such as a MOS capacitor or a pn junction capacitor or may be a parasitic capacitance associated with a gate of a MOS transistor at the input node of the follower circuit 40.

According to this embodiment, the pixel part 101 has a follower circuit as an example of a component which feeds back a signal output from the differential amplifier circuit 10 to the differential amplifier circuit 10. However, the component which feeds back a signal output from the differential amplifier circuit 10 may be any component other than a follower circuit and may only be required to give a signal output from the differential amplifier circuit 10 to the MOS transistor 12.

[Second Embodiment]

With reference to drawings, a photoelectric conversion apparatus according to a second embodiment will be described by focusing on differences from the first embodiment.

Figure 3A:
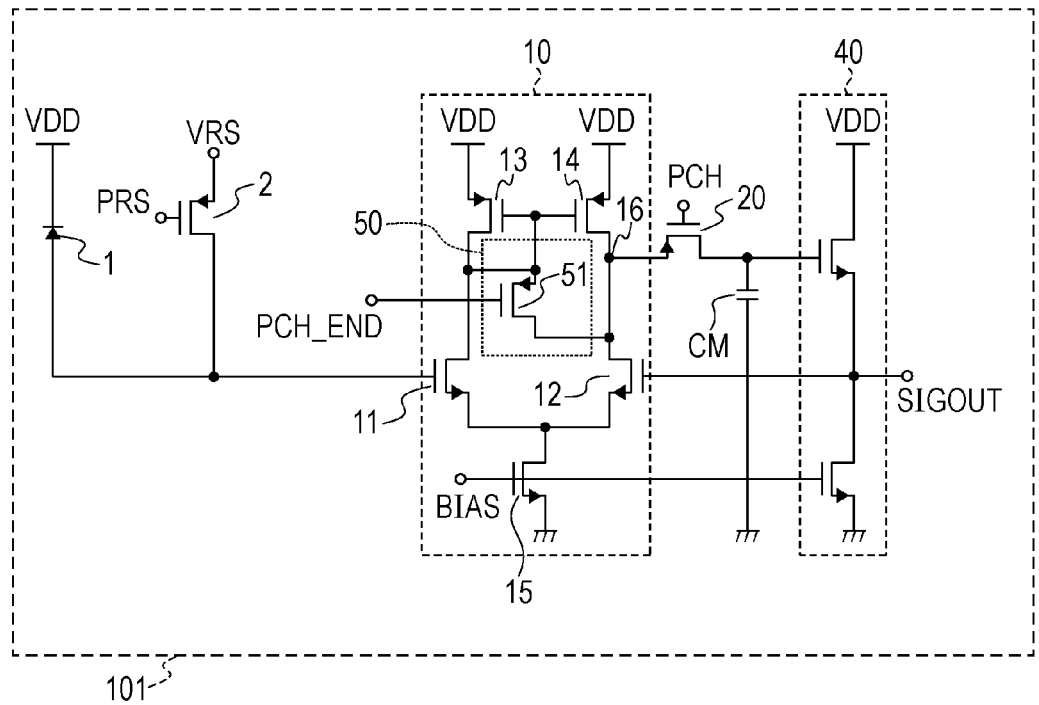
FIG. 3A is an equivalent circuit diagram illustrating another example of a pixel part.

FIG. 3A is an equivalent circuit diagram of a pixel part 101 included in a photoelectric conversion apparatus according to this embodiment. Like reference numerals refer to like members having the same functions between the pixel parts 101 in FIG. 1B and FIG. 3A.

According to this embodiment, one main node of the MOS transistor 51 in the potential control unit 50 is electrically connected to a node to which gates of both of the MOS transistor 13 and MOS transistor 14 and one main node of the MOS transistor 13 are electrically connected. The other main node of the MOS transistor 51 is electrically connected to the output node 16.

The operation of the photoelectric conversion apparatus including the pixel part 101 illustrated in FIG. 3A may be the same as the one in FIG. 1C according to the first embodiment.

At the time t3, the pulse PCH_END is shifted to the H level. Thus, gates of the MOS transistor 13 and MOS transistor 14 and one main nodes of the MOS transistor 11 and MOS transistor 12 are short-circuited. Current is fed from the MOS transistor 15 of a current source to the MOS transistor 13 and MOS transistor 14.

The potential of the output node 16 has a lowered value acquired by subtracting the sum of the threshold voltage and overdrive voltage of the MOS transistor 14 from the power supply voltage VDD. Thus, the potential difference between the potentials of the input node and gate of the switch MOS transistor 20 increases toward turning off the switch MOS transistor 20, compared with the photoelectric conversion apparatus disclosed in Japanese Patent Laid-Open No. 2000-78472. Thus, the same advantages as those of the photoelectric conversion apparatus of the first embodiment may be acquired.

According to this embodiment, the photoelectric converting unit 1 stores positive holes on basis of incident light. The photoelectric converting unit 1 may store electrons on basis of incident light by inverting the conductivity types of the MOS transistors in the photoelectric conversion apparatus.

[Third Embodiment]

With reference to drawings, a photoelectric conversion apparatus according to a third embodiment will be described by focusing on differences from the first embodiment.

Figure 3B:
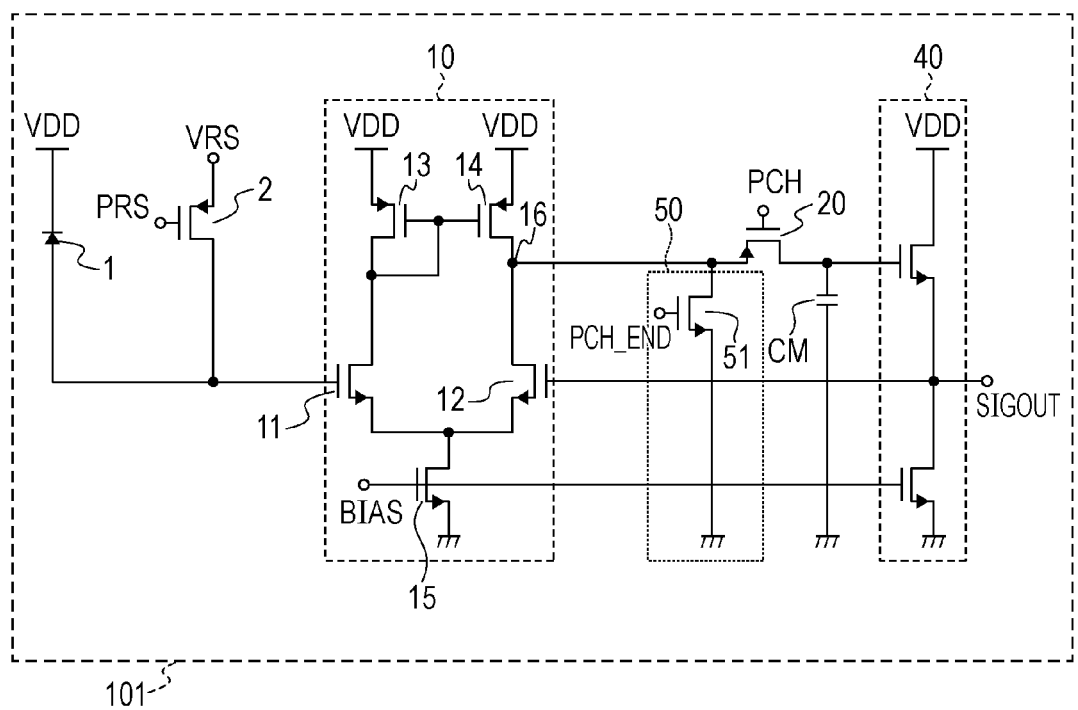
FIG. 3B is an equivalent circuit diagram illustrating another example of a pixel part.

FIG. 3B is an equivalent circuit diagram of the pixel part 101 included in the photoelectric conversion apparatus according to a third embodiment. Like reference numerals refer to like members having the same functions between the pixel parts 101 in FIG. 1B and FIG. 3B.

In the pixel part 101 included in the photoelectric conversion apparatus according to this embodiment, one main node of the MOS transistor 51 in the potential control unit 50 is electrically connected to an input node of the switch MOS transistor 20. Ground level potential is given to the other main node of the MOS transistor 51.

The operation of the pixel part 101 illustrated in FIG. 3B may be the same as the one in FIG. 1C according to the first embodiment.

When the pulse PCH_END is shifted to the H level at a time t3, the potential of an input node of the switch MOS transistor 20 is clipped to the ground level. Thus, the difference between the potentials of the input node and gate of the switch MOS transistor 20 increases toward turning off the switch MOS transistor 20, compared with the photoelectric conversion apparatus disclosed in Japanese Patent Laid-Open No. 2000-78472. Thus, the same advantages as those of the photoelectric conversion apparatus of the first and second embodiments may be acquired.

According to this embodiment, the photoelectric converting unit 1 generates positive holes on basis of incident light. The photoelectric converting unit 1 may store electrons on basis of incident light by inverting the conductivity types of the MOS transistors in the pixel parts 101. The MOS transistor 51 in this case is a PMOS transistor. Instead of the ground level potential, power supply voltage VDD may be given to the MOS transistor 51. The potential of the input node of the switch MOS transistor 20 may be defined close to power supply voltage VDD.

[Fourth Embodiment]

With reference to drawings, a photoelectric conversion apparatus according to a fourth embodiment will be described by focusing on differences from the first embodiment.

Figure 4A:
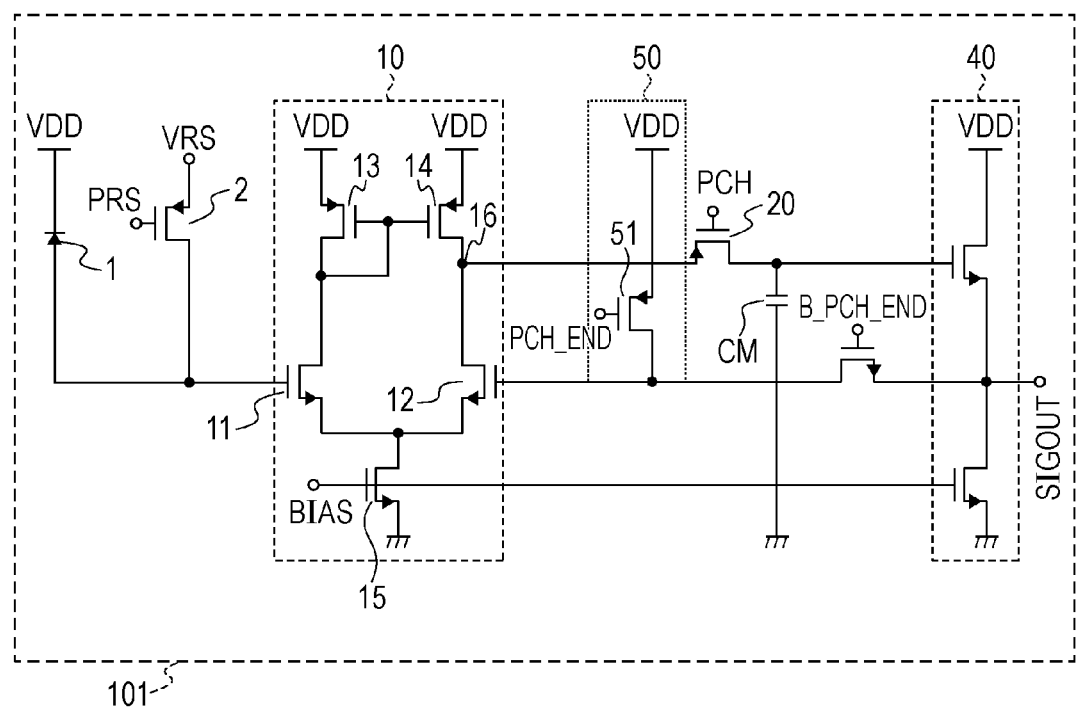
FIG. 4A is an equivalent circuit diagram illustrating another example of a pixel part.

FIG. 4A is an equivalent circuit diagram of the pixel part 101 included in the photoelectric conversion apparatus according to the fourth embodiment. Like reference numerals refer to like members having the same functions between the pixel parts 101 in FIG. 1B and FIG. 4A.

In the pixel part 101 included in the photoelectric conversion apparatus according to this embodiment, one main node of the MOS transistor 51 in the potential control unit 50 is electrically connected to a gate of the MOS transistor 12. Power supply voltage VDD is given to the other main node of the MOS transistor 51. The gate of the MOS transistor 12 is electrically connected to an output node of the follower circuit 40 through a MOS transistor 60.

Figure 4B:
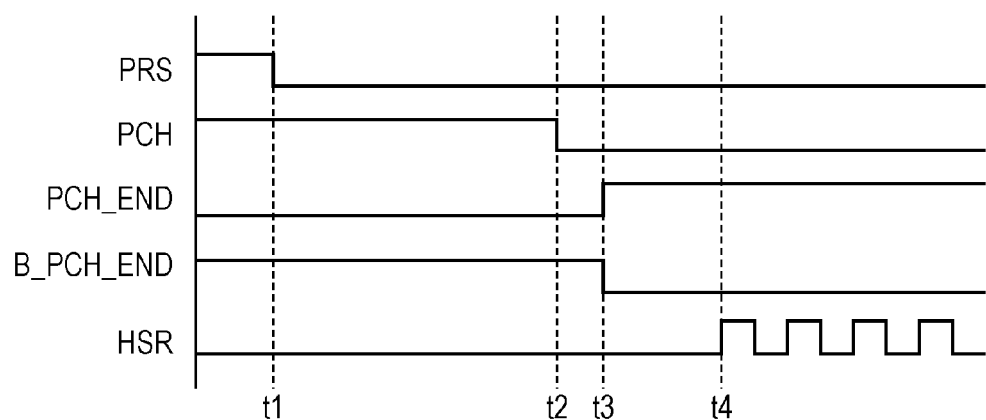
FIG. 4B is a timing chart illustrating another example of operations of a photoelectric conversion apparatus.

With reference to FIG. 4B, an operation of the photoelectric conversion apparatus according to this embodiment will be described.

The pulse B_PCH_END is to be given to a gate of the MOS transistor 60 and is acquired by inverting the pulse PCH_END. The pulse B_PCH_END is at the H level from before a time t1 and is shifted to the L level at a time t3. Operations of other pulses may be the same as the operations illustrated in FIG. 1C.

At the time t3, when the pulse PCH_END is shifted to the H level, the MOS transistor 51 causes the potential of a gate of the MOS transistor 12 to be the power supply voltage VDD and causes the potential of the input node of the switch MOS transistor 20 to be close to the ground level. The potential difference between the potentials of the input node and gate of the switch MOS transistor 20 increases toward turning off the switch MOS transistor 20, compared with the photoelectric conversion apparatus disclosed in Japanese Patent Laid-Open No. 2000-78472. Thus, the same advantages as those of the photoelectric conversion apparatus of the first, second, and third embodiments may be acquired. Turning off the MOS transistor 60 may block the current from the MOS transistor 51 to the follower circuit 40, which may suppress an increase of current consumption for turning on the MOS transistor 51.

In the pixel part 101 according to the third embodiment, turning on the MOS transistor 51 causes current to be fed from the output node 16 to the MOS transistor 51, which increases the current consumption. On the other hand, in the pixel part 101 included in the photoelectric conversion apparatus according to this embodiment, turning on the MOS transistor 51 does not increase the number of the current path, which may advantageously reduce the current consumption, compared with the pixel part 101 according to the third embodiment.

According to this embodiment, the photoelectric converting unit 1 stores positive holes on basis of incident light. The photoelectric converting unit 1 may store electrons on basis of incident light by inverting the conductivity types of the MOS transistors in the pixel parts 101. The MOS transistor 51 in this case is an NMOS transistor. Instead of power supply voltage VDD, the ground level potential may be given to the MOS transistor 51.

[Fifth Embodiment]

With reference to drawings, a photoelectric conversion apparatus according to a fifth embodiment will be described by focusing on differences from the first embodiment.

Figure 5A:
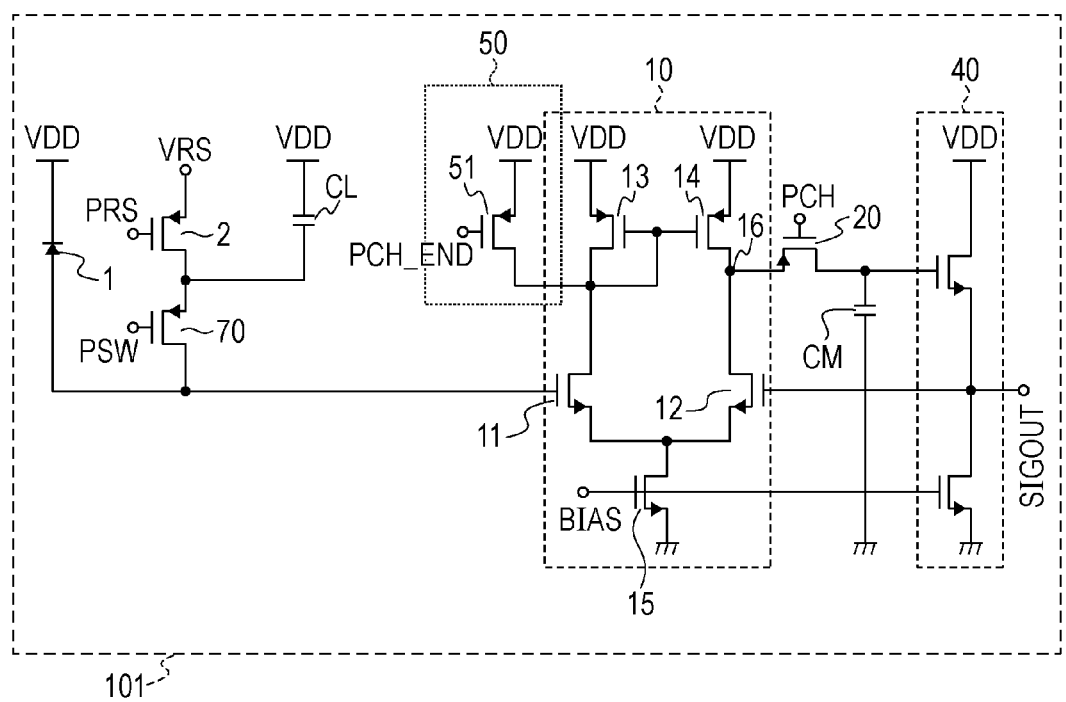
FIG. 5A is an equivalent circuit diagram illustrating another example of a pixel part.

FIG. 5A is an equivalent circuit diagram of the pixel part 101 included in the photoelectric conversion apparatus according to a fifth embodiment.

A photoelectric conversion apparatus of this embodiment including the pixel part 101 according to the first embodiment illustrated in FIG. 1B further includes a MOS transistor 70 and a capacitance element CL.

The MOS transistor 70 is electrically connected to the MOS transistor 11 in parallel with the photoelectric converting unit 1. The MOS transistor 70 is a sixth MOS transistor according to this embodiment. The capacitance element CL has one main node electrically connected to the MOS transistor 70 and the other main node which receives power supply voltage VDD.

Figure 5B:
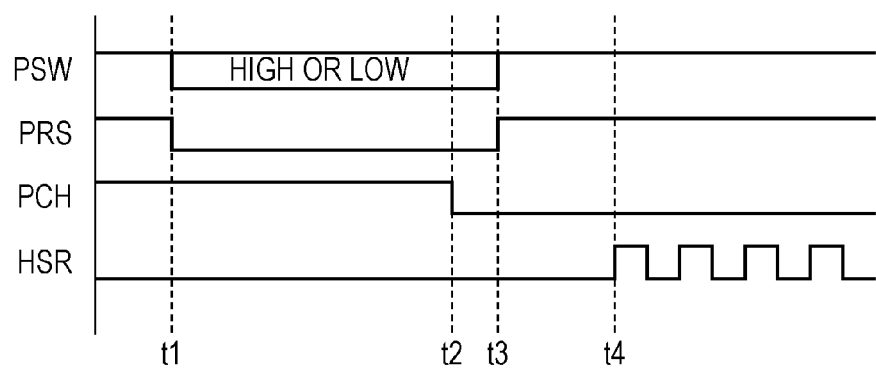
FIG. 5B is a timing chart illustrating another example of operations of a photoelectric conversion apparatus.

An operation of the photoelectric conversion apparatus according to this embodiment will be described with reference to FIG. 5B.

A pulse PSW is to be given to a gate of the MOS transistor 70. Until a time t1, the pulse PSW has the H level, which resets a charge in the capacitance element CL.

During a period from a time t2 to a time t3, the charge conversion coefficient may be changed by the amount equivalent to the capacitance in the capacitance element CL in accordance with the shift of the pulse PSW to the H level or the L level. This allows a change of the sensitivity of the pixel part 101 for incident light.

At a time t4, the shift register 102 causes the signal processing units 103 to sequentially output signals on basis of signals output from the pixel parts 101.

In the photoelectric conversion apparatus according to this embodiment, for example, the pulse PSW is shifted to the H level, and the operation from the time t1 to the time t4 is performed. It is assumed here that it is determined that a signal output from the signal processing unit is lower than a reference value. In this case, the pulse PSW is shifted to the L level, and the operation from the time t1 to the time t4 is performed again during a period from the time t1 to the time t3. Thus, the photoelectric conversion apparatus of this embodiment is configured to change the capacitance value of the electrical path between the photoelectric converting unit 1 and the MOS transistor 11 in accordance with the amount of incident light to differentiate its sensitivity.

The photoelectric conversion apparatus according to this embodiment having the same potential control unit 50 according to the first embodiment may provide the same advantages as those of the first embodiment.

The photoelectric converting unit 1 according to this embodiment generates positive holes on basis of incident light. The photoelectric converting unit 1 may store electrons on basis of incident light by inverting the conductivity types of the MOS transistors in the pixel parts 101.

[Sixth Embodiment]

A configuration of a photoelectric conversion apparatus according to a sixth embodiment will be described.

Figure 6:
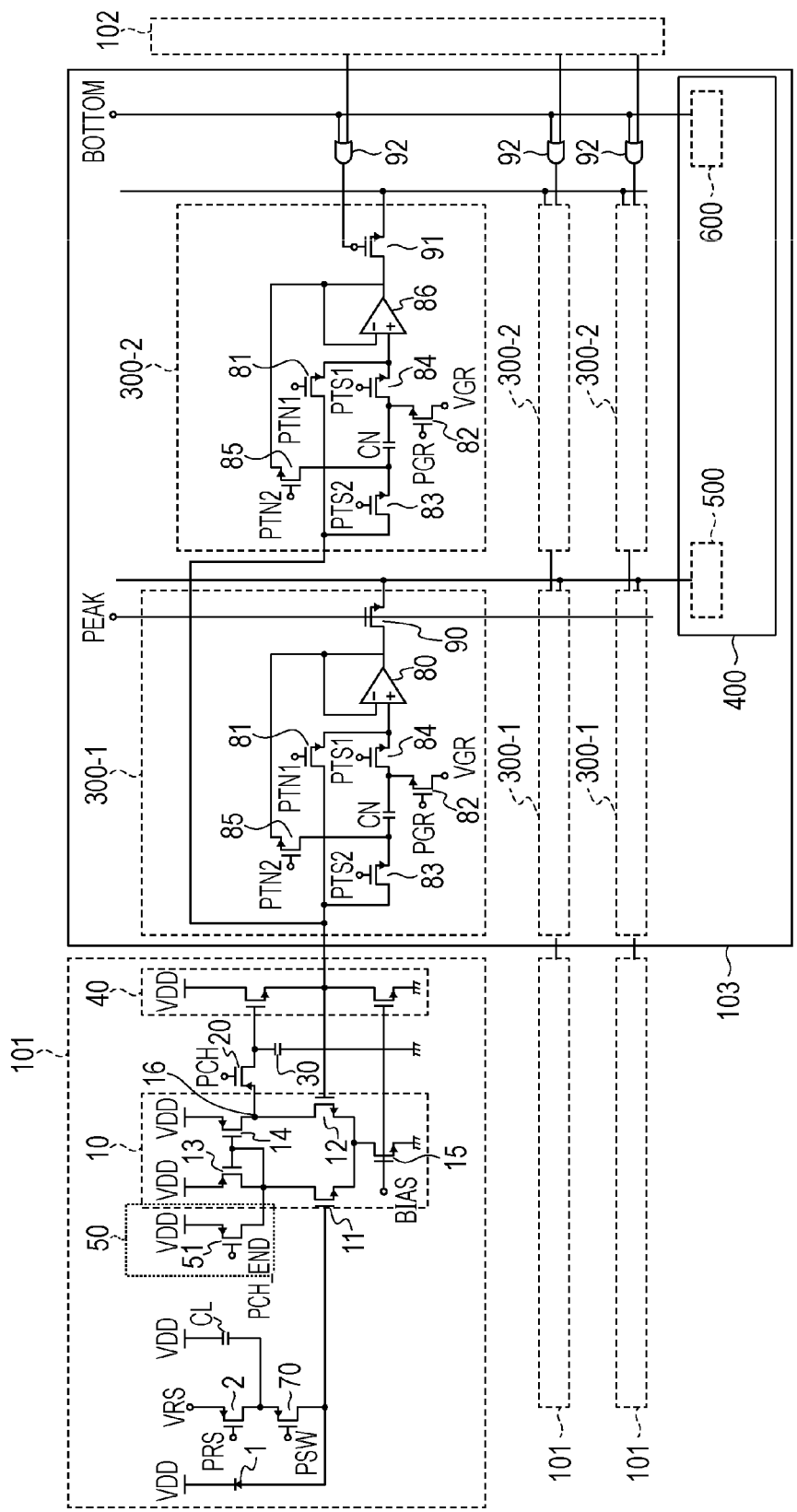
FIG. 6 is an equivalent circuit diagram illustrating another example of a pixel part.

FIG. 6 is an equivalent circuit diagram illustrating an example of a pixel part 101 included in a photoelectric conversion apparatus according to this embodiment. FIG. 6 illustrates three pixel parts 101 in FIG. 1A. The signal processing unit 103 has an output unit 400 and noise processing circuits 300-1 and 300-2. The output of the follower circuit 40 in each of the pixel parts 101 is given to the noise processing circuits 300-1 and 300-2 provided correspondingly to the pixel part 101. The noise processing circuits 300-1 are electrically connected to a maximum value detecting unit 500. The noise processing circuits 300-2 are electrically connected to a minimum value detecting unit 600 through OR circuits 92. When a pulse Bottom output from the signal storage control unit 105 is shifted to the H level, the minimum values of signals output from the noise processing circuits 300-2 are given to the minimum value detecting unit 600. When the shift register 102 sequentially selects the noise processing circuits 300-2, signals output from the noise processing circuits 300-2 are given to the minimum value detecting unit 600. The minimum value detecting unit 600 sequentially outputs signals of the noise processing circuits 300-2 to an external output unit 106.

The output unit 400 has the maximum value detecting unit 500 and the minimum value detecting unit 600. The maximum value detecting unit 500 receives a maximum value signal among signals output from the noise processing circuits 300-1 when the pulse PEAK output from the signal storage control unit 105 has the H level. The maximum value detecting unit 500 outputs the maximum value signal to the AGC circuit 104. The minimum value detecting unit 600 receives a minimum value signal among signals output from the noise processing circuits 300-2 when the pulse Bottom output from the signal storage control unit 105 has the H level. The minimum value detecting unit 600 outputs the minimum value signal to the AGC circuit 104. The output unit 400 performs a signal output operation on basis of the signal from the signal storage control unit 105, as in the first embodiment. The pixel part 101 in the photoelectric conversion apparatus according to this embodiment may have any configuration of the first to fifth embodiments. According to this embodiment, the pixel part 101 according to the fifth embodiment is provided.

The differential amplifier 80 in the noise processing circuit 300-1 and the differential amplifier 86 in the noise processing circuit 300-2 cause their outputs to be fed back to their inverting input node to operate in a voltage follower configuration. Each of the noise processing circuits 300-1 and 300-2 has the MOS transistor 81, clamp capacitance element CN, MOS transistor 82, and MOS transistor 85, which form a clamp circuit. The MOS transistor 81 in each of the noise processing circuits 300-1 and 300-2 is used to select whether to bring the pixel part 101 and a non-inverting input node of the differential amplifier 80 into conduction or not. The MOS transistor 82 in each of the noise processing circuits 300-1 and 300-2 is used to select whether to give a potential VGR to one main node of the clamp capacitance element CN or not. The MOS transistor 85 in each of the noise processing circuits 300-1 and 300-2 is used to select whether to bring the output node of the differential amplifier 80 and the clamp capacitance element CN into conduction or not.

The MOS transistor 83 in each of the noise processing circuits 300-1 and 300-2 is used to select whether to bring the pixel part 101 and the clamp capacitance element CN into conduction or not. The MOS transistor 84 in each of the noise processing circuits 300-1 and 300-2 is used to select whether to bring the clamp capacitance element CN and the non-inverting input node of the differential amplifier 80 into conduction or not. The MOS transistor 90 in the noise processing circuit 300-1 is used to select whether to bring the differential amplifier 80 and the maximum value detecting unit 500 into conduction or not. The MOS transistor 91 in the noise processing circuit 300-2 is used to select whether to bring the differential amplifier 86 and the minimum value detecting unit 600 into conduction or not.

The MOS transistor 91 in the noise processing circuit 300-2 is in conduction when one of the pulse HSR output from the shift register 102 and the pulse Bottom output from the signal storage control unit 105 has the H level.

Figure 7A:
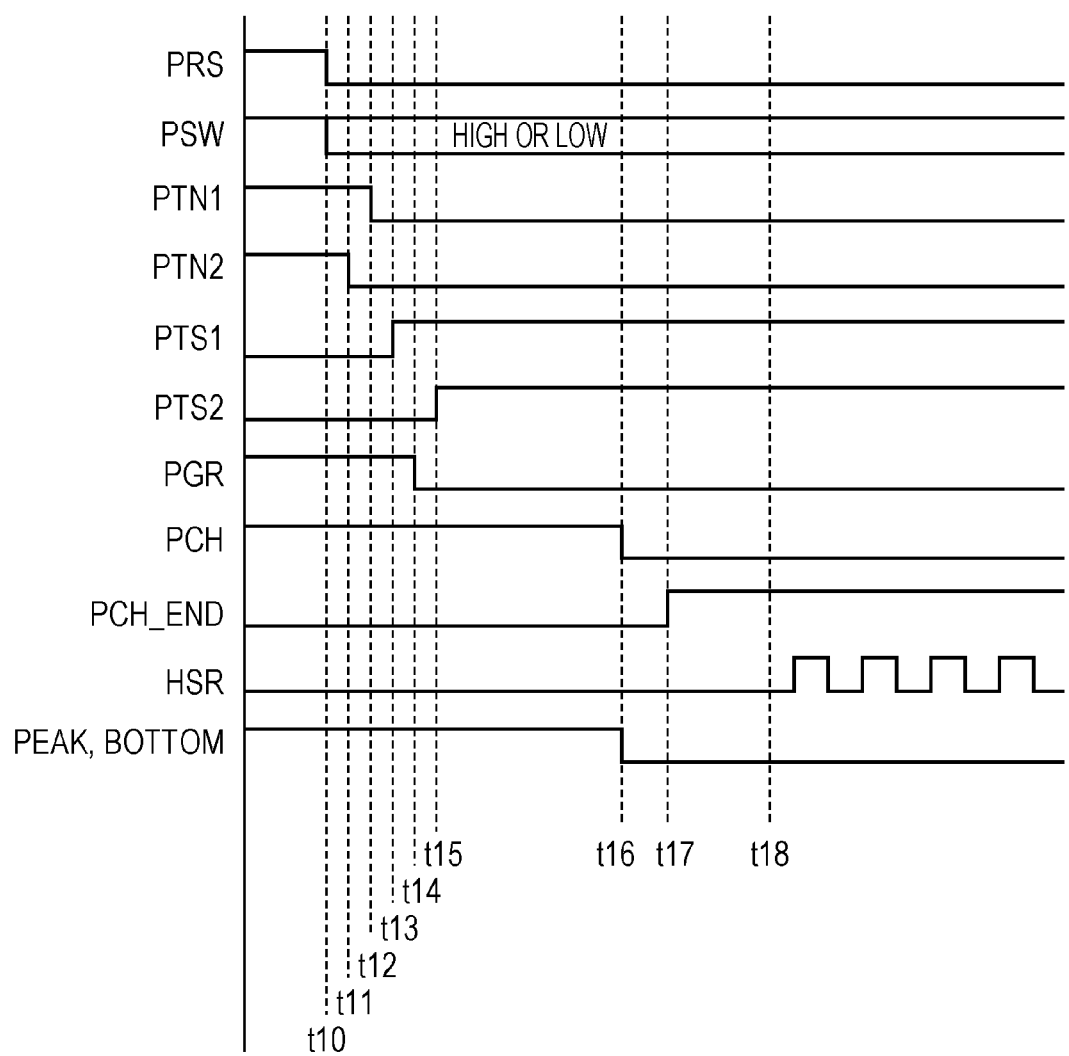
FIG. 7A is a timing chart illustrating another example of operations by a photoelectric conversion apparatus.

Next, operations of the noise processing circuits 300-1 and 300-2 illustrated in FIG. 6 will be described with reference to FIG. 7A.

Until a time t10, pulses PRS, PSW, PCH, PTN1, PTN2, PGR, PEAK, and Bottom have the H level. This resets the photoelectric converting unit 1, differential amplifier circuit 10, capacitance element CL, capacitance element CM, and clamp capacitance element CN. The pulses PCH_END, PTS2, and PTS1 have the L level.

At the time t10, the pulse PRS is shifted to the L level, and the reset of the photoelectric converting unit 1 and differential amplifier circuit 10 is cancelled. The pulse PSW may have either H level or L level in accordance with the amount of incident light, like the fifth embodiment.

At a time t11, the pulse PTN2 is shifted to the L level. Then, at a time t12, the pulse PTN1 is shifted to the L level. At a time t13, the pulse PTS1 is shifted to the H level. At a time t14, the pulse PGR is shifted to the L level. The operation from the time t11 to the time t14 holds a charge based on a noise signal output from the follower circuit 40 to the clamp capacitance element CN.

At a time t15, the pulse PTS2 is shifted to the H level. This gives the output of the follower circuit 40 to the clamp capacitance element CN through the MOS transistor 83. The clamp capacitance element CN holds a charge based on a noise signal. Therefore, the non-inverting input node of the differential amplifier 80 receives a signal acquired by subtracting a noise signal from the signal output from the follower circuit 40. Thus, the differential amplifier 80 amplifies and outputs a signal acquired by subtracting a noise signal from a signal output from the follower circuit 40. Therefore, the photoelectric conversion apparatus according to this embodiment allows the signal processing unit 103 to output a signal having a less noise component.

At a time t16, pulses PCH, PEAK, and Bottom are shifted to the L level. At a time t17, a pulse PCH_END is shifted to the H level. This may suppress a change of a signal level output from the follower circuit 40 when the switch MOS transistor 20 has an OFF state, like the photoelectric conversion apparatus of the first embodiment, compared with the photoelectric conversion apparatus disclosed in Japanese Patent Laid-Open No. 2000-78472.

At and after a time t18, the shift register 102 gives a pulse HSR to each of the MOS transistor 90 to cause the corresponding noise processing circuit 300 to output a signal.

The configuration of the noise processing circuit 300 is not limited to the one illustrated in FIG. 6. For example, a clamp capacitance element may be provided in an electrical path between an output node of the follower circuit 40 and the MOS transistor 90 and hold a noise signal of a follower circuit in the clamp capacitance element.

[Seventh Embodiment]

Figure 7B:
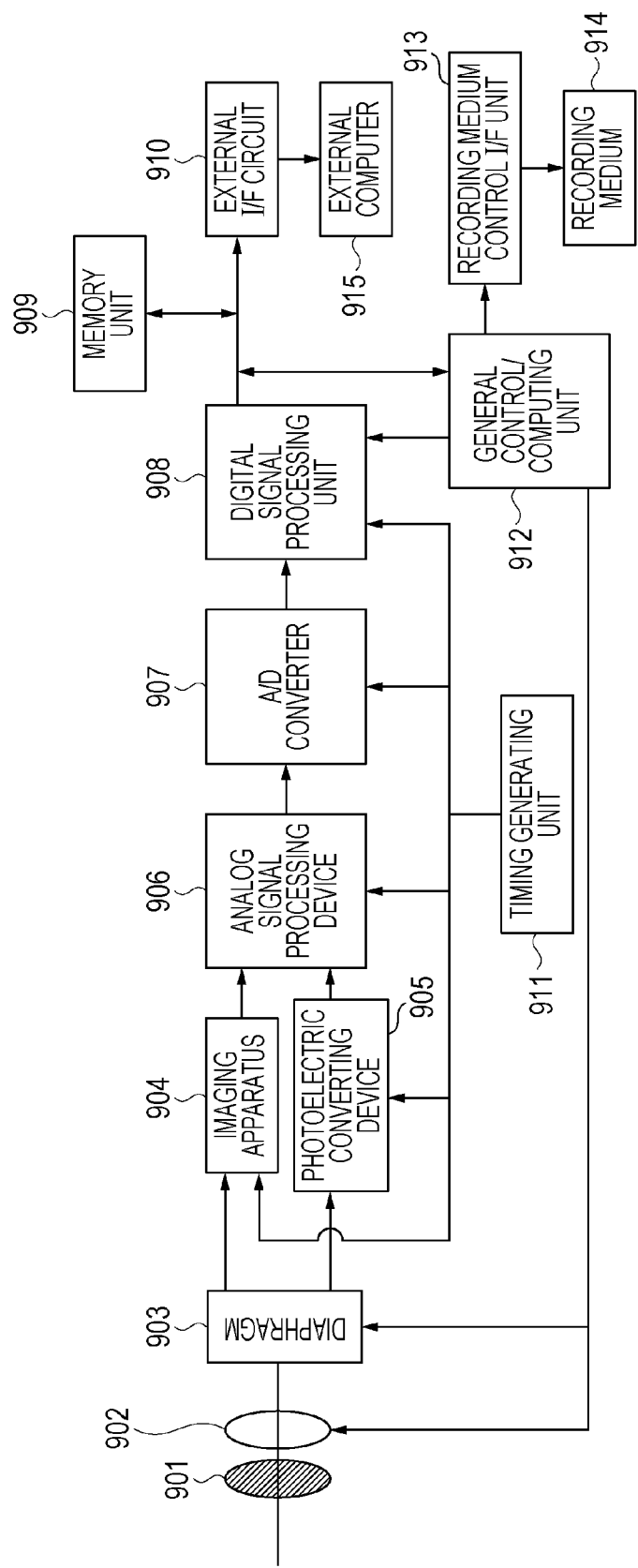
FIG. 7B is a block diagram illustrating an example of an imaging system.

FIG. 7B is a block diagram illustrating an example of a configuration of an imaging system according to a seventh embodiment.

An imaging system according to this embodiment includes a barrier 901, a lens 902 which forms an optical image of a subject, and a diaphragm 903 to be used for adjusting the amount of light passing through the lens 902. The imaging system further includes an imaging apparatus 904 which acquires an optical image of a subject formed on the lens 902 as an image signal. The imaging system further includes a photoelectric conversion apparatus 905 according to any one of first to fifth embodiments. The barrier 901, lens 902, and diaphragm 903 constitute an optical system which gathers incident light to the imaging apparatus 904 and photoelectric conversion apparatus 905.

The imaging system further includes an analog signal processing apparatus 906 which processes signals output from the imaging apparatus 904 and the photoelectric conversion apparatus 905 and an A/D converter 907 which performs analog-to-digital conversion on a signal output from the analog signal processing apparatus 906. The imaging system further includes a digital signal processing unit 908 which may perform a correction on image data output from the A/D converter 907 and a data compression.

The imaging system further includes a memory unit 909 which temporarily stores image data, an external I/F circuit 910 to be used for communication with an external computer, for example, and a timing generating unit 911 which outputs a timing signal to the digital signal processing unit 908, for example. The imaging system further includes a general control/computing unit 912 which controls a calculation and an entire camera, a recording medium control I/F unit 913, a removable recording medium 914 to or from which acquired image data is recorded or read, such as a semiconductor memory, and an external computer 915.

Next, an image capturing operation of the imaging system will be described.

The barrier 901 is opened, and the general control/computing unit 912 calculates a distance to a subject by the phase difference detection above on basis of a signal output from the photoelectric conversion apparatus 905. After that, the lens 902 is driven on basis of the calculation result. Whether it is in focus or not is determined again. If it is determined that it is out of focus, auto-focus control is performed to drive the lens 902 again. Next, after the focusing is determined, a storage operation in the imaging apparatus 904 starts. When the storage operation in the imaging apparatus 904 ends, an image signal output from the imaging apparatus 904 undergoes analog-to-digital conversion by the A/D converter 907, passes through the digital signal processing unit 908, and then is written to the memory unit 909 under control of the general control/computing unit 912. After that, the data stored in the memory unit 909 are recorded on the recording medium 914 through the recording medium control I/F unit 913 under control of the general control/computing unit 912. Alternatively, the data may be given to a computer directly through the external I/F unit 910.

The disclosure may provide a photoelectric conversion apparatus, a method for driving a photoelectric conversion apparatus, and an imaging system by which subthreshold leakage current is not easily fed to a switch MOS transistor.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-212541, filed Sep. 26, 2012, which is hereby incorporated by reference herein in its entirety.

What is claimed is:

1. A photoelectric conversion apparatus comprising:
a photoelectric converting unit which stores a charge generated by photoelectric conversion on incident light;
a differential amplifying unit having a first input node electrically connected to the photoelectric converting unit;
a switch Metal Oxide Semiconductor (MOS) transistor;
an output circuit having an input node electrically connected to an output node of the differential amplifying unit via the switch MOS transistor and an output node electrically connected to a second input node of the differential amplifying unit; and
a potential control unit,
wherein
a first main node of the switch MOS transistor is electrically connected to the output node of the differential amplifying unit,
a second main node of the switch MOS transistor is electrically connected to the input node of the output circuit; and
the potential control unit is configured to control a potential of the first main node of the switch MOS transistor so as to prevent a voltage between a control node of the switch MOS transistor and the first main node of the switch MOS transistor from changing toward a direction for turning on the switch MOS transistor in a period when a predetermined potential is given to the control node of the switch MOS transistor and a signal based on the charge in the photoelectric converting unit is given to the first input node of the differential amplifying unit, the predetermined potential being configured to set the voltage between the control node of the switch MOS transistor and the first main node of the switch MOS transistor to be within a threshold voltage of the switch MOS transistor.

2. The photoelectric conversion apparatus according to claim 1, wherein the differential amplifying unit outputs a signal to the output node of the differential amplifying unit on basis of the signal based on the charge given to the first input node so that the potential control unit controls the potential of the first main node for reducing a subthreshold leakage current from a subthreshold leakage current occurred in the switch MOS transistor in the period.

3. The photoelectric conversion apparatus according to claim 1, wherein the potential control unit gives a potential to the first main node of the switch MOS transistor such that voltage between the control node of the switch MOS transistor and the first main node of the switch MOS transistor is greater than voltage when the differential amplifying unit outputs a signal based on the charge output by the photoelectric converting unit.

4. The photoelectric conversion apparatus according to claim 1, further comprising a capacitance element on an electrical path between the switch MOS transistor and the input node of the output circuit, wherein
the capacitance element holds a signal output by the differential amplifying unit; and
the output circuit outputs a signal based on a signal stored in the capacitance element.

5. The photoelectric conversion apparatus according to claim 1, wherein the potential control unit is electrically connected to an electrical path between the output node of the output circuit and the second input node of the differential amplifying unit.

6. The photoelectric conversion apparatus according to claim 1, further comprising a noise processing circuit which outputs a signal acquired by subtracting a noise component from a signal output by the output circuit.

7. The photoelectric conversion apparatus according to claim 1, wherein
the differential amplifying unit includes
a first MOS transistor,
a second MOS transistor having a same conductivity type as that of the first MOS transistor,
a third MOS transistor having the opposite conductivity type of that of the first MOS transistor,
a fourth MOS transistor having a same conductivity type as that of the third MOS transistor, and
a current source;
the third MOS transistor has a control node being the first input node of the differential amplifying unit;
the fourth MOS transistor has a control node being the second input node of the differential amplifying unit;
each of the first MOS transistor and the second MOS transistor has a control node electrically connected to a first node;
the third MOS transistor has a first main node electrically connected to the current source and a second main node electrically connected to a main node of the first MOS transistor;
the first node is electrically connected to the second main node of the third MOS transistor;
the fourth MOS transistor has a first main node electrically connected to the current source and a second main node electrically connected to the output node of the differential amplifying unit and a first main node of the second MOS transistor; and
the potential control unit is electrically connected to the first node.

8. The photoelectric conversion apparatus according to claim 7, wherein the potential control unit includes a fifth MOS transistor;
the fifth MOS transistor has a first main node electrically connected to the first node; and
the fifth MOS transistor has a second main node which receives a reference voltage.

9. The photoelectric conversion apparatus according to claim 7, wherein the potential control unit includes a fifth MOS transistor;
the fifth MOS transistor has a first main node electrically connected to the first node; and
the fifth MOS transistor has a second main node electrically connected to the output node of the differential amplifying unit.

10. The photoelectric conversion apparatus according to claim 1, wherein the potential control unit includes a fifth MOS transistor;
the fifth MOS transistor has a first main node electrically connected to an electrical path between the output node of the differential amplifying unit and the one main node of the switch MOS transistor; and
the fifth MOS transistor has a second main node which receives a reference voltage.

11. The photoelectric conversion apparatus according to claim 1, further comprising:
a sixth MOS transistor electrically connected to the first input node of the differential amplifying unit in parallel with the photoelectric converting unit;
a capacitance element electrically connected to the first input node of the differential amplifying unit through the sixth MOS transistor.

12. The photoelectric conversion apparatus according to claim 1, wherein the charge to be stored in the photoelectric converting unit are positive holes, the switch MOS transistor is a PMOS transistor, and the direction for turning on the switch MOS transistor is defined as a voltage at the control node of the switch MOS transistor against the first main node of the switch MOS transistor becomes lower.

13. The photoelectric conversion apparatus according to claim 1, wherein the charge to be stored in the photoelectric converting unit are electrons, the switch MOS transistor is an NMOS transistor, and the direction for turning on the switch MOS transistor is defined as a voltage at the control node of the switch MOS transistor against the first main node of the switch MOS transistor becomes higher.

14. An imaging system comprising:

the photoelectric conversion apparatus according to claim 1;

an imaging apparatus which generates an image signal based on incident light; and an optical system which gathers incident light to the photoelectric conversion apparatus and the imaging apparatus.

15. The imaging system according to claim 14, wherein the photoelectric conversion apparatus has a plurality of pixel parts each including the photoelectric converting unit, the switch MOS transistor, and the differential amplifying unit, a signal processing unit, and an AGC circuit;

the imaging system further has a control unit;

the signal processing unit outputs a maximum value and a minimum value of signals output by the plurality of pixel parts to the AGC circuit;

the AGC circuit finishes the storage of the charge in the plurality of pixel parts on basis of a difference between the maximum value and the minimum value;

the signal processing unit outputs signals output by the plurality of pixel parts to the control unit;

the control unit detects a focal point on basis of a signal output by the signal processing unit; and after the control unit detects a focal point, the imaging apparatus generates the image signal.

16. A method for driving a photoelectric conversion apparatus having a photoelectric converting unit which stores a charge generated by photoelectric conversion on incident light;

a differential amplifying unit having first input node electrically connected to the photoelectric converting unit;

a switch MOS transistor; and an output circuit having an input node electrically connected to an output node of the differential amplifying unit via the switch MOS transistor and an output node electrically connected to a second input node of the differential amplifying unit;

wherein a first main node of the switch MOS transistor is electrically connected to the output node of the differential amplifying unit, a second main node of the switch MOS transistor is electrically connected to the input node of the output circuit, the method comprising controlling a potential of the first main node of the switch MOS transistor so as to prevent a voltage between a control node of the switch MOS transistor and the first main node of the switch MOS transistor from changing toward a direction for turning on the switch MOS transistor in a period when a predetermined potential given to the control node of the switch MOS transistor and a signal based on the charge in the photoelectric converting unit is given to the first input node of the differential amplifying unit, the predetermined potential being configured to set the voltage between the control node of the switch MOS transistor and the first main node of the switch MOS transistor to be within a threshold voltage of the switch MOS transistor.

17. The method for driving a photoelectric conversion apparatus according to claim 16, wherein the photoelectric conversion apparatus switches the capacitance value between the photoelectric converting unit and the first input node of the differential amplifying unit on basis of the amount of incident light.

* * * * *